United States Patent
Weng et al.

(10) Patent No.: US 8,769,409 B2
(45) Date of Patent: Jul. 1, 2014

(54) SYSTEMS AND METHODS FOR IMPROVING OBJECT DETECTION

(75) Inventors: Chung-Yi Weng, Taichung (TW); Ho Chao Huang, New Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 197 days.

(21) Appl. No.: 13/117,427

(22) Filed: May 27, 2011

(65) Prior Publication Data

US 2012/0304063 A1 Nov. 29, 2012

(51) Int. Cl.
*G06F 3/00* (2006.01)

(52) U.S. Cl.
USPC .......................................... 715/716; 715/723

(58) Field of Classification Search
USPC .................................................. 715/716, 723
See application file for complete search history.

(56) References Cited

U.S. PATENT DOCUMENTS

| | | | | |
|---|---|---|---|---|
| 5,202,961 A * | 4/1993 | Mills et al. | .................... | 715/720 |
| 5,469,192 A * | 11/1995 | Allen et al. | .................... | 345/157 |
| 5,594,859 A * | 1/1997 | Palmer et al. | ................... | 715/756 |
| 5,598,183 A * | 1/1997 | Robertson et al. | ............ | 715/856 |
| 5,889,506 A * | 3/1999 | Lopresti et al. | ................ | 345/158 |
| 5,929,857 A * | 7/1999 | Dinallo et al. | ................ | 715/840 |
| 5,966,121 A * | 10/1999 | Hubbell et al. | ................ | 715/726 |
| 6,262,724 B1 * | 7/2001 | Crow et al. | .................... | 715/723 |
| 6,498,628 B2 | 12/2002 | Iwamura | | |
| 6,501,515 B1 | 12/2002 | Iwamura | | |
| 6,538,665 B2 * | 3/2003 | Crow et al. | .................... | 715/723 |
| 6,850,256 B2 * | 2/2005 | Crow et al. | .................... | 715/798 |
| 7,111,240 B2 * | 9/2006 | Crow et al. | .................... | 715/723 |
| 7,315,984 B2 * | 1/2008 | Crow et al. | .................... | 715/716 |
| 7,318,196 B2 * | 1/2008 | Crow et al. | .................... | 715/716 |
| 7,441,192 B2 * | 10/2008 | Pisz | .............................. | 715/727 |
| 7,458,025 B2 * | 11/2008 | Crow et al. | .................... | 715/723 |
| 8,196,043 B2 * | 6/2012 | Crow et al. | .................... | 715/716 |
| 8,269,722 B2 * | 9/2012 | Wu et al. | ........................ | 345/158 |
| 2002/0057287 A1 * | 5/2002 | Crow et al. | .................... | 345/716 |
| 2003/0043191 A1 * | 3/2003 | Tinsley et al. | ................. | 345/762 |
| 2003/0080991 A1 * | 5/2003 | Crow et al. | .................... | 345/716 |
| 2003/0110057 A1 * | 6/2003 | Pisz | ................................. | 705/1 |
| 2003/0128227 A1 * | 7/2003 | Crow et al. | .................... | 345/700 |
| 2003/0128228 A1 * | 7/2003 | Crow et al. | .................... | 345/716 |
| 2003/0146927 A1 * | 8/2003 | Crow et al. | .................... | 345/716 |
| 2003/0193572 A1 * | 10/2003 | Wilson et al. | ............. | 348/207.99 |
| 2004/0193413 A1 * | 9/2004 | Wilson et al. | ................. | 704/243 |

(Continued)

OTHER PUBLICATIONS

Windows Media Player Version 12.0 (2009).*

*Primary Examiner* — Steven Sax
*Assistant Examiner* — David Choi
(74) *Attorney, Agent, or Firm* — McClure, Qualey & Rodack, LLP

(57) ABSTRACT

Various systems and methods for adaptively modifying a user interface are described. One embodiment is a method performed in a multimedia playback system for adaptively modifying a user interface. The method comprises receiving, by the multimedia playback system, multimedia content and displaying the multimedia content. The method further comprises generating, by a user interface generator, one or more controls displayed in conjunction with the multimedia content, identifying, by an object detector, a target object in a field of view of a video capture device coupled to the multimedia playback system, and predicting, by a selection predictor, a next selection of one of the one or more controls based on a path defined by the target object. The method further comprises displaying, by the user interface generator, a virtual pointer representing the target object in a vicinity of the predicted next selection of the one or more controls.

20 Claims, 17 Drawing Sheets

(56) References Cited

U.S. PATENT DOCUMENTS

| | | |
|---|---|---|
| 2008/0170776 A1* | 7/2008 | Albertson et al. ............ 382/154 |
| 2009/0228841 A1* | 9/2009 | Hildreth ........................ 715/863 |
| 2010/0050134 A1* | 2/2010 | Clarkson ....................... 715/863 |
| 2010/0142815 A1* | 6/2010 | Sim ............................... 382/167 |
| 2011/0069866 A1* | 3/2011 | Kim et al. ..................... 382/103 |
| 2011/0072399 A1* | 3/2011 | Kim et al. ..................... 715/858 |
| 2011/0163944 A1* | 7/2011 | Bilbrey et al. ................ 345/156 |
| 2011/0193939 A1* | 8/2011 | Vassigh et al. .................. 348/46 |
| 2011/0199296 A1* | 8/2011 | Simpson ....................... 345/157 |
| 2011/0246329 A1* | 10/2011 | Geisner et al. ............... 705/27.1 |
| 2011/0320949 A1* | 12/2011 | Ohki et al. .................... 715/727 |
| 2012/0157203 A1* | 6/2012 | Latta et al. ..................... 463/32 |
| 2012/0192117 A1* | 7/2012 | Migos et al. .................. 715/863 |
| 2012/0304063 A1* | 11/2012 | Weng et al. ................... 715/716 |

* cited by examiner

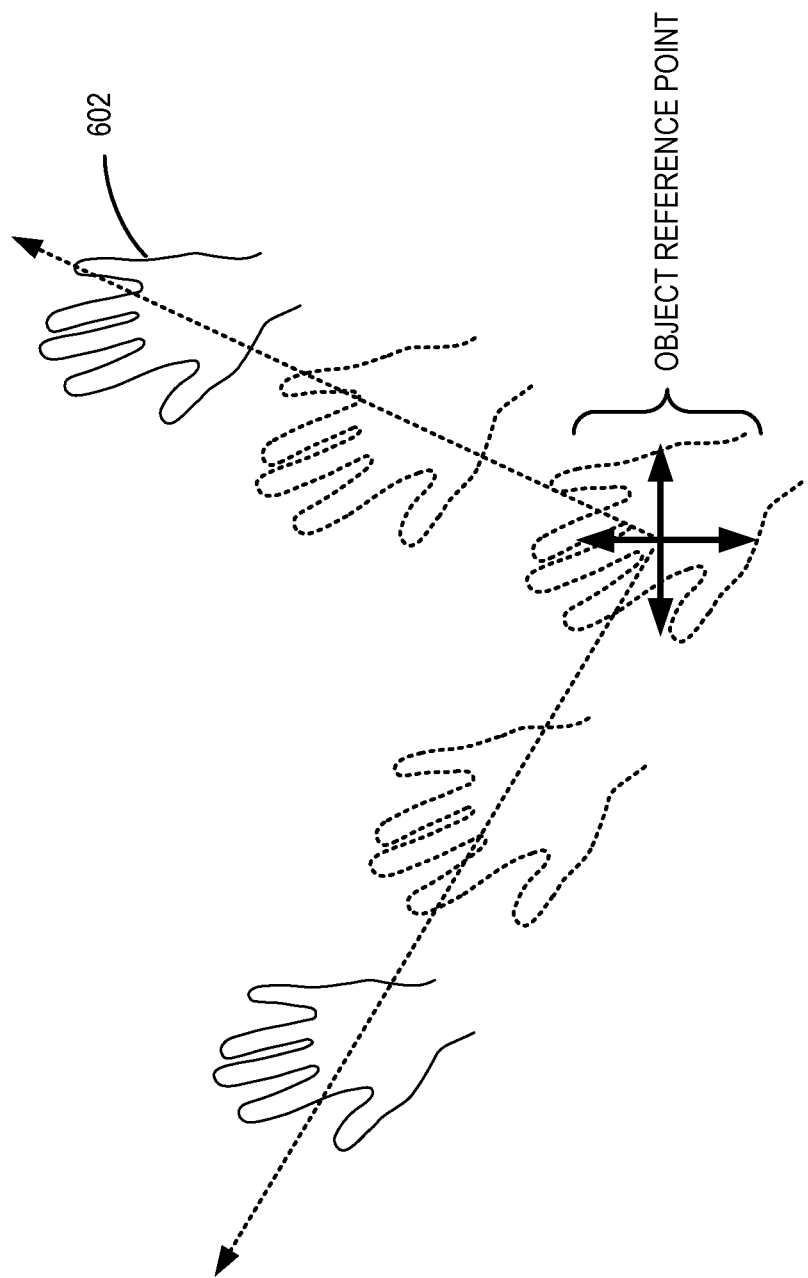

SYSTEMS AND METHODS FOR IMPROVING OBJECT DETECTION

TECHNICAL FIELD

The present disclosure generally relates to improving object detection in user interfaces.

BACKGROUND

Various playback systems are available that offer users the ability to control playback via virtual onscreen controls. The virtual controls comprise such basic commands as stop, play, skip forward, and so on. Today flat panel televisions are commonly available in sizes that provide for larger and larger viewing distances. As the size of displays increases, the placement of controls becomes even more important. For example, placing a set of virtual controls on the lower left hand corner of a large display to control content displayed on the upper right hand corner of the display can be inconvenient for the viewer to control playback, particularly as the viewer moves.

Another perceived shortcoming is that while the controls may initially be in a location on the screen for the user to access, it can become inconvenient for the user to access the controls as the user moves since the location of the controls remains static. Such systems generally require precise movement on the part of the user with respect to the controls in order to select the control and trigger the corresponding function.

SUMMARY

One embodiment, among others, is a method performed in a multimedia playback system for adaptively modifying a user interface. The method comprises receiving, by the multimedia playback system, multimedia content and displaying the multimedia content. The method further comprises generating, by a user interface generator, one or more controls displayed in conjunction with the multimedia content, identifying, by an object detector, a target object in a field of view of a video capture device coupled to the multimedia playback system, and predicting, by a selection predictor, a next selection of one of the one or more controls based on a path defined by the target object. The method further comprises displaying, by the user interface generator, a virtual pointer representing the target object in a vicinity of the predicted next selection of the one or more controls.

Another embodiment is a multimedia playback system configured to adaptively modify a user interface. The system comprises a user interface generator configured to generate one or more controls displayed in conjunction with a multimedia content displayed by the multimedia playback system and an object detector configured to identify a target object in a field of view of a video capture device coupled to the multimedia playback system. The system further comprises a selection predictor configured to predict a next selection of one of the one or more controls based on a path defined by the target object, wherein the user interface generator displays a virtual pointer representing the target object in a vicinity of the predicted next selection of the one or more controls.

Another embodiment is a method performed in a multimedia playback system for adaptively modifying a user interface. The method comprises receiving, by the multimedia playback system, multimedia content and displaying the multimedia content. The method further comprises generating, by a user interface generator, playback controls displayed in conjunction with the multimedia content and identifying, by an object detector, a target object in a field of view of a video capture device coupled to the multimedia playback system, the target object being used to select among the playback controls. The method further comprises predicting, by a selection predictor, a next selection among the playback controls based on a path defined by the target object with respect to an initial reference point, wherein predicting is performed according to a smallest angle among angles formed between the path defined by the target object and paths between the playback controls. The method further comprises displaying, by the user interface generator, a virtual pointer representing the target object in a vicinity of the next selection of the one or more controls.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 6-14 illustrate various features of embodiments for adaptively modifying a user interface.

DETAILED DESCRIPTION

Figure 1:
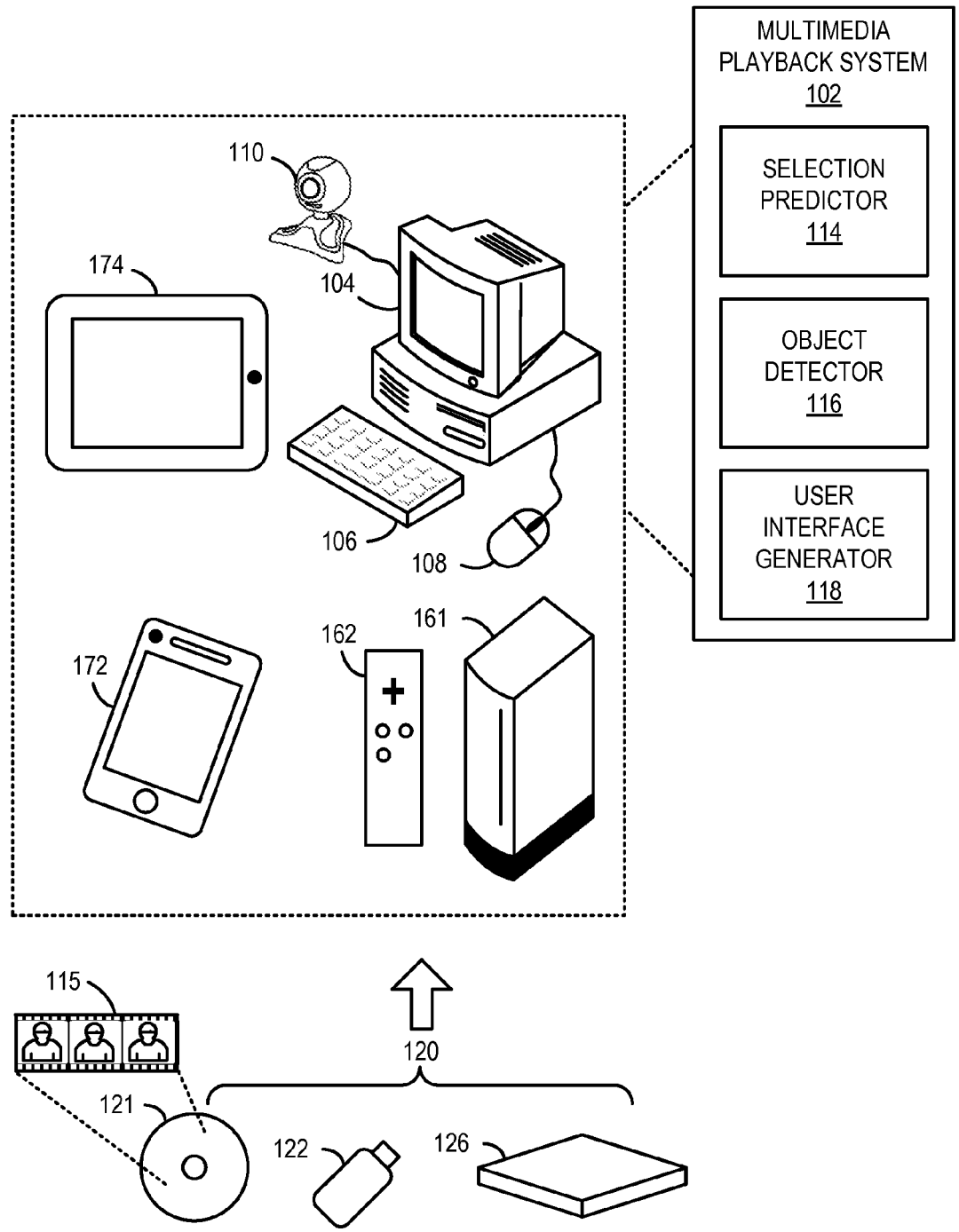
FIG. 1 is a block diagram of a multimedia playback system configured to adaptively modify a user interface.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Embodiments are described for improving human-machine interaction by optimizing the placement of controls based on a next predicted selection by the user. For various embodiments, the placement of virtual buttons is performed according to the detection of a user controlling playback of a video using onscreen controls. In this regard, virtual controls/buttons are adaptively placed proximal to the location of the user for optimum interaction with the system. In accordance with some embodiments, the virtual control/button that the user is about to select is moved in accordance with the user's movement so that the user can quickly select the control.

Figure 4:
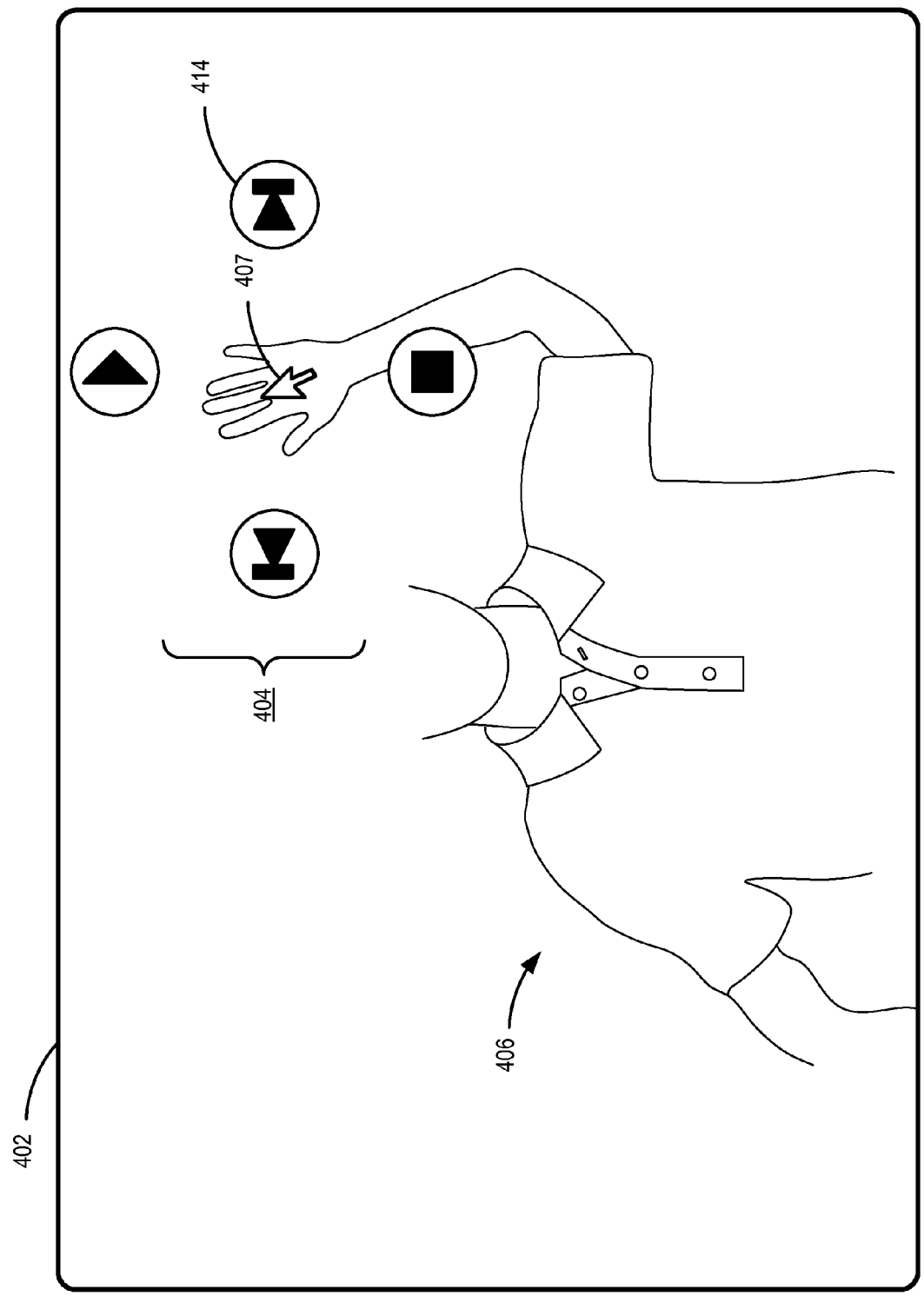
FIG. 4 illustrates use of onscreen controls by a user of the multimedia playback system.

One application for the adaptive placement of controls as described herein is for playback of video content whereby a user interface for controlling playback of the video is shown on the display with the video. Reference is made to FIG. 4. As shown in the example, various playback controls 404 are shown on a display area 402 that comprise a stop playback control, skip forward control, skip backward control, and a play control. The controls 404 are shown on the display area 402 while video content such as a movie is being played. As described in more detail below, the motion of the user 406 is tracked. For example, if the user 406 elects to skip to the next chapter in the movie, the user 406 navigates the controls 404 by moving his hand over the skip forward control 414 and "clicks" on the control by placing his hand over the location of the skip forward control 414 on the display. Note that for purposes of the illustrations described herein, the user 406 is shown in the display area 402. However, an image of the user 406 is typically not shown on the display area 402. Rather the display area 402 shows the video content being played and the playback controls 404. Furthermore, a virtual pointer 407 corresponding to the user 406 is typically shown on the display area 402. Thus, for the illustration in FIG. 4, the movement of the user's hand is tracked whereby the position of the virtual pointer 407 tracks that of the user's hand. The user 406 is therefore able to use the virtual pointer 407 to make a selection among the different controls 404.

Figure 5:
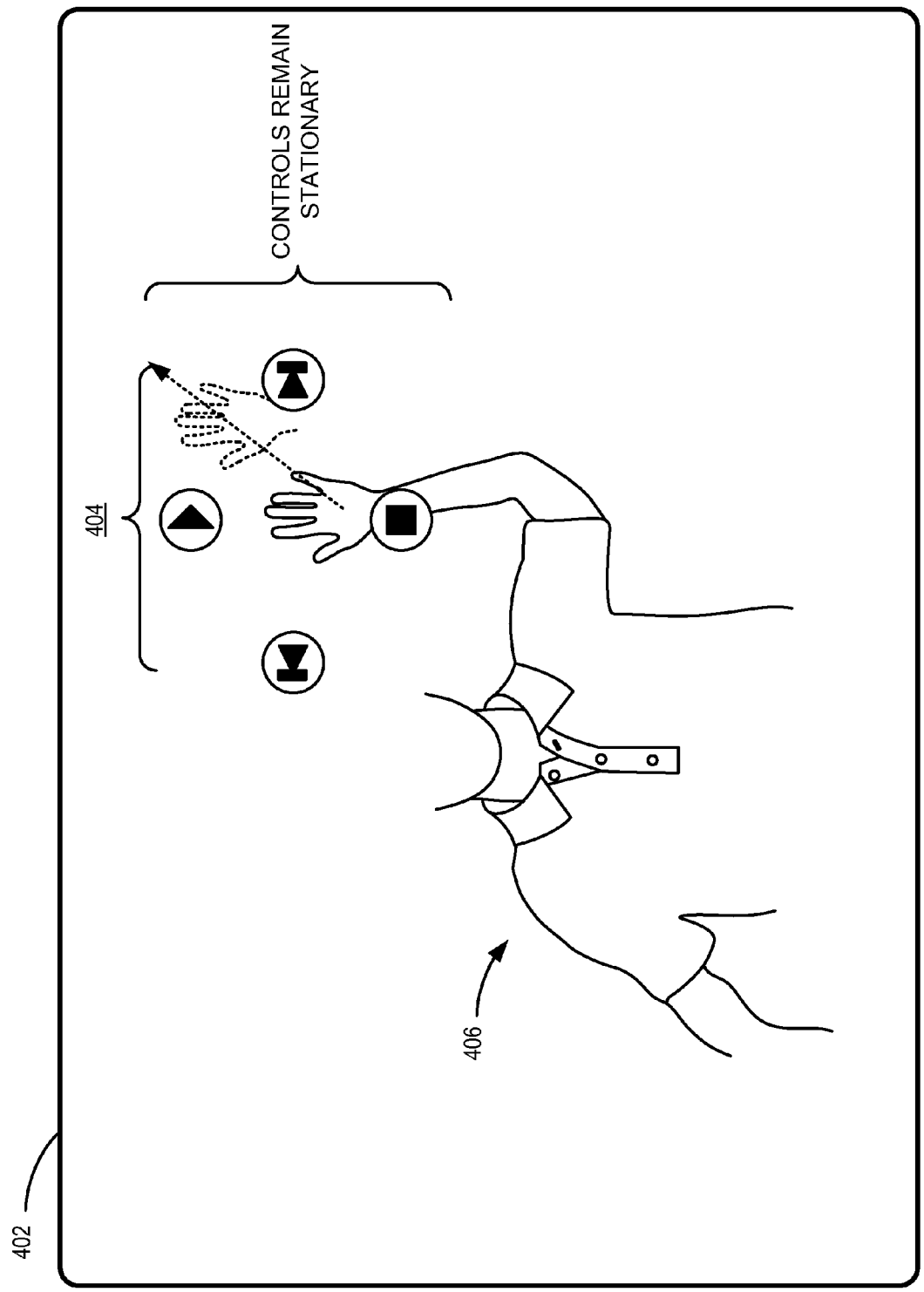
FIG. 5 illustrates a perceived shortcoming associated with other multimedia playback systems.

One perceived shortcoming with systems that deploy such onscreen controls 404 is that the user 406 viewing the video content may move around. Reference is made to FIG. 5. As shown, the user's hand is used for making a selection among a set of onscreen controls 404. While the navigation controls 404 are shown in close proximity to the user 406, the user 406 must still move his hand to the exact location of the control to be selected. For example, to select the "play" control, the user 406 moves his hand in an upward manner and selects the control by holding his hand over the "play" control for a predetermined amount of time. However, if the user's hand is not precisely on the control to be selected, no selection is made. To illustrate, FIG. 5 depicts a user 406 moving his hand from a first position to a second position, as shown by the dashed line. As the controls 404 remain stationary in typical setups, no selection is made based on the hand movement shown as such systems do not predict the selection about to be made by the user 406. This can be inconvenient for the user 406 as the user 406 must precisely move his hand to the exact location of the control to be selected.

Various embodiments are described for the adaptive placement of playback controls based on a prediction of the user's next selection. For some embodiments, one or more controls are relocated based on the path of the user's hand. As an example, with reference to FIG. 6, suppose that the system described herein predicts that the user's hand is moving in the direction of the "play" button. Based on this prediction, the play button is moved directly in the path defined by the user's hand movement, thereby providing the user 406 with quick and easy access to the play button. This technique also allows users 406 to move their hands in the general direction of the desired control without having to place their hands in a pinpoint location on the display area 402.

A description of a system for adaptively updating a user interface in a multimedia playback system 102 is now described followed by a discussion of the operation of the components within the system 102. FIG. 1 is a block diagram of a multimedia playback system 102 configured to provide a user interface and receive user input. The multimedia playback system 102 may be embodied, for example, as a desktop computer, computer workstation, laptop, or other computing platform. In other embodiments, the multimedia playback system 102 may be embodied as a video gaming console 161, which includes a video game controller 162 for receiving user preferences. For such embodiments, the video gaming console 161 may be connected to a television (not shown) or other display. In other embodiments, the multimedia playback system 102 may be embodied as a smartphone 172 or a tablet 174. The multimedia playback system 102 includes a display 104 and as well as input devices such as a keyboard 106 and a mouse 108. The multimedia playback system 102 may also be coupled to a video capture device 110 such as a webcam for capturing images of a user of the multimedia playback system 102. When embodied as a smartphone 172 or tablet 174, the multimedia playback system 102 may include an integrated camera for capturing video.

The multimedia playback system 102 comprises a selection predictor 114, an object detector 116, and a user interface generator 118. The selection predictor 114 is configured to predict a next selection among one or more controls (e.g., playback controls) based on a path defined by the target object, which may comprise, for example, a user's hand. The target object may also comprise a remote sensor coupled to the multimedia playback system 102. For some embodiments, the selection predictor 114 does not predict a next selection if the target object is moving too fast and/or the target object moves outside the field of view of the video capture device 110. Based on this prediction, user interface generator 118 adjusts the control(s) according to the predicted selection. The object detector 116 is configured to detect the presence of one or more objects within the display area and track the motion of the identified objects. Typically, the object detector 116 detects the presence of the user controlling playback of the media content 115 being viewed. In the event that more than one individual is detected by the object detector 116, the user controlling playback can be manually designated as the target object for tracking purposes. Based on movement of the target object, the controls identified by the selection predictor 114 are adjusted. The object detector 116 can be configured to detect objects that are within a field of view of the video capture device 110.

Figure 8:
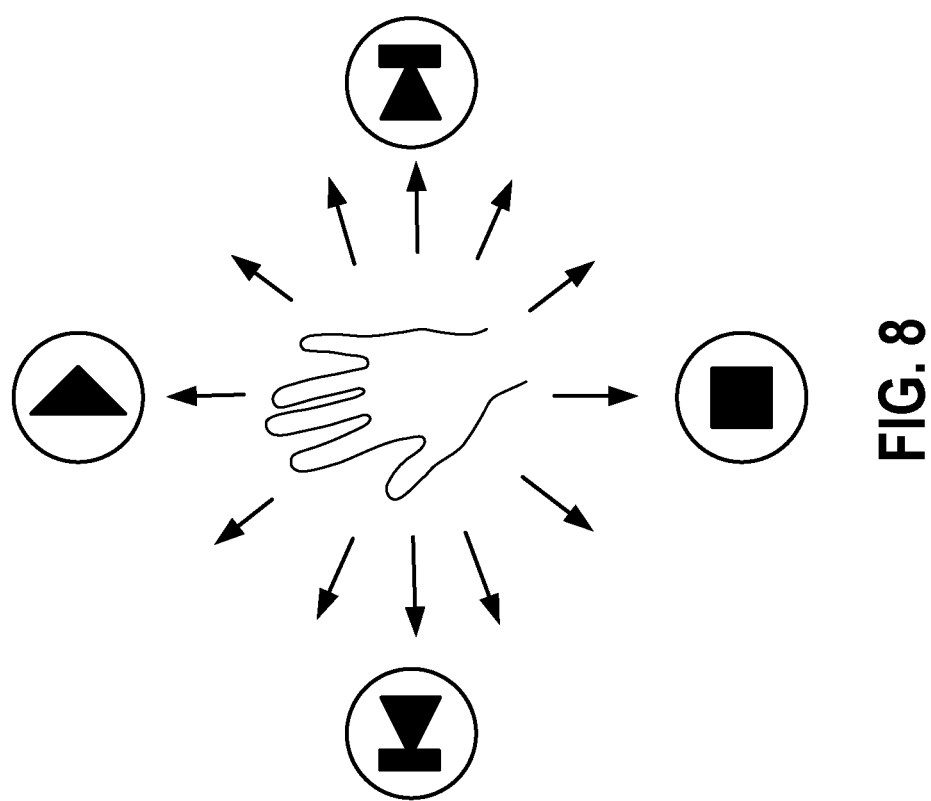

The user interface generator 118 is configured to generate and update the existing user interface being displayed such that the controls detected by the selection predictor 114 are placed in a location proximal to the one or more objects detected by the object detector 116. For example, as shown in FIG. 8, the controls may be placed such that the target object (e.g., the user of the multimedia playback system 102) is centrally located among the controls in order to provide the user easy access to the controls. At the same time, the size of the controls is taken into account by the selection predictor 114 so that the controls are resized as needed.

In some scenarios, the controls in a user interface are used to play media content comprising video or still images. For example, a user may wish to control playback of a movie or incorporate special effects using various special effects controls/tools. For other situations, the user may wish to zoom in and crop portions of a still image. The multimedia playback system 102 is configured to receive media content 115 stored on a tangible storage medium 120 such as, by way of example and without limitation, a compact disc (CD) 121, a universal serial bus (USB) flash drive 122, and an external hard drive 126. As non-limiting examples, the multimedia playback system 102 may be configured to read media content 115 encoded in such formats as Digital Video Disc (DVD), Video CD (VCD), High Definition DVD (HD-DVD), BLU-RAY Disc, and China Blue High-Definition (CBHD) stored on a storage medium 121, 122, 126. Note that the media content 115 may comprise such multimedia content as video titles, slideshows, and digital images.

For some embodiments, the multimedia playback system 102 may also be configured to read multimedia content from managed copies 122 of an HD-DVD or a BLU-RAY Disc. The multimedia playback system 102 may support any one of a number of common computer interfaces, such as, but not limited to IEEE-1394 High Performance Serial Bus (Firewire), USB, a serial connection, and a parallel connection. When embodied as a tablet or a smartphone, the multimedia playback system 102 may also be configured to receive media content 115 wirelessly via a mobile phone connection. The multimedia playback system 102 may be coupled to a network (not shown), such as the Internet or a local area network (LAN). Through the network, the multimedia playback system 102 may receive media content 115 from another computing system or from video sharing servers and other content providers.

Figure 2:
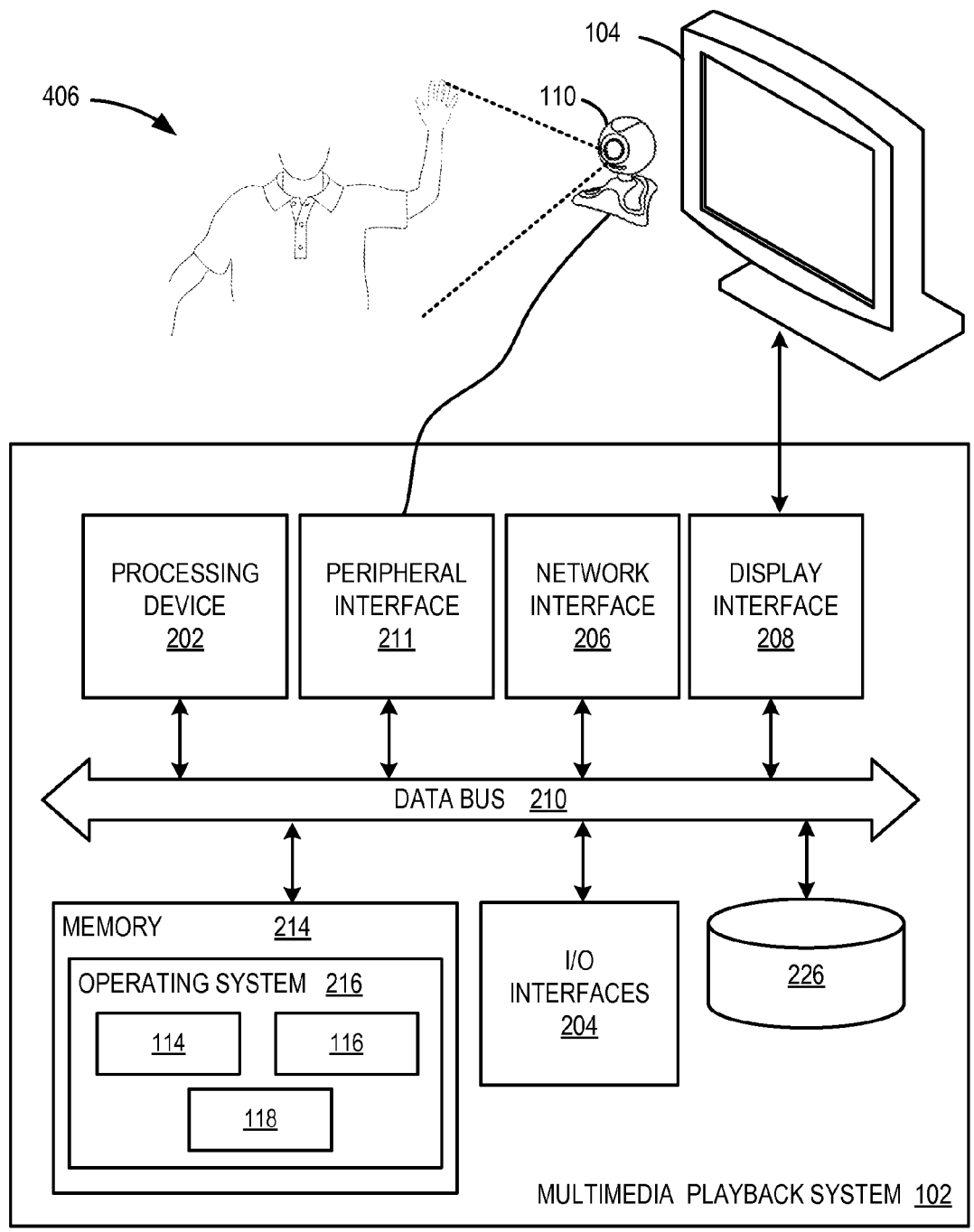
FIG. 2 is an embodiment of the multimedia playback system of FIG. 1.

FIG. 2 illustrates an embodiment of the multimedia playback system 102 shown in FIG. 1. As discussed earlier, the multimedia playback system 102 may be embodied in any one of a wide variety of wired and/or wireless computing devices, such as a desktop computer, portable computer, a dedicated server computer, multiprocessor computing device, smart phone, personal digital assistant (PDA), tablet, and so forth. As shown in FIG. 2, the multimedia playback system 102 comprises memory 214, a processing device 202, a number of input/output interfaces 204, a display interface 208, a peripheral interface 211, network interface 206, and mass storage 226, wherein each of these devices are connected across a local data bus 210. The multimedia playback system 102 may be configured to receive media content 115 via the peripheral interface 211 or an optical disc drive interface (not shown). Note, however, that the multimedia playback system 102 may also receive media content 115 from the Internet via the network interface 206.

The processing device 202 may include any custom made or commercially available processor, a central processing unit (CPU) or an auxiliary processor among several processors associated with the multimedia playback system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components 114, 116, 118 of the multimedia playback system 102 depicted in FIG. 1. In accordance with such embodiments, the components 114, 116, 118 are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the multimedia playback system 102 is embodied as a personal computer, these components may interface with one or more user input devices 204, which may comprise a keyboard or a mouse, as shown in FIG. 2. The display 104 may comprise a computer monitor, a liquid crystal display (LCD) or other display device. While a mouse 108 and/or keyboard 106 may be used to navigate the user interface provided by the user interface generator 118, a display 104 that provides touch screen functionality may also be incorporated as part of the multimedia playback system 102.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

As shown in FIG. 2, a video capture device 110 such as a webcam is coupled to the multimedia playback system 102 via a cable attached to the peripheral interface 211 of the multimedia playback system 102. The video capture device 110 captures images of a user 406. Based on the captured video, a set of virtual controls shown on the display 104 can be controlled by the user 406. The multimedia playback system 102 interprets certain motions by the user 406 (e.g., a tapping motion) as invoking onscreen commands shown on the display 104. As will be described in more detail below, the components 114, 116, 118 in the multimedia playback system 102 are configured to adaptively place controls based on the location of the user 406.

Figure 3:
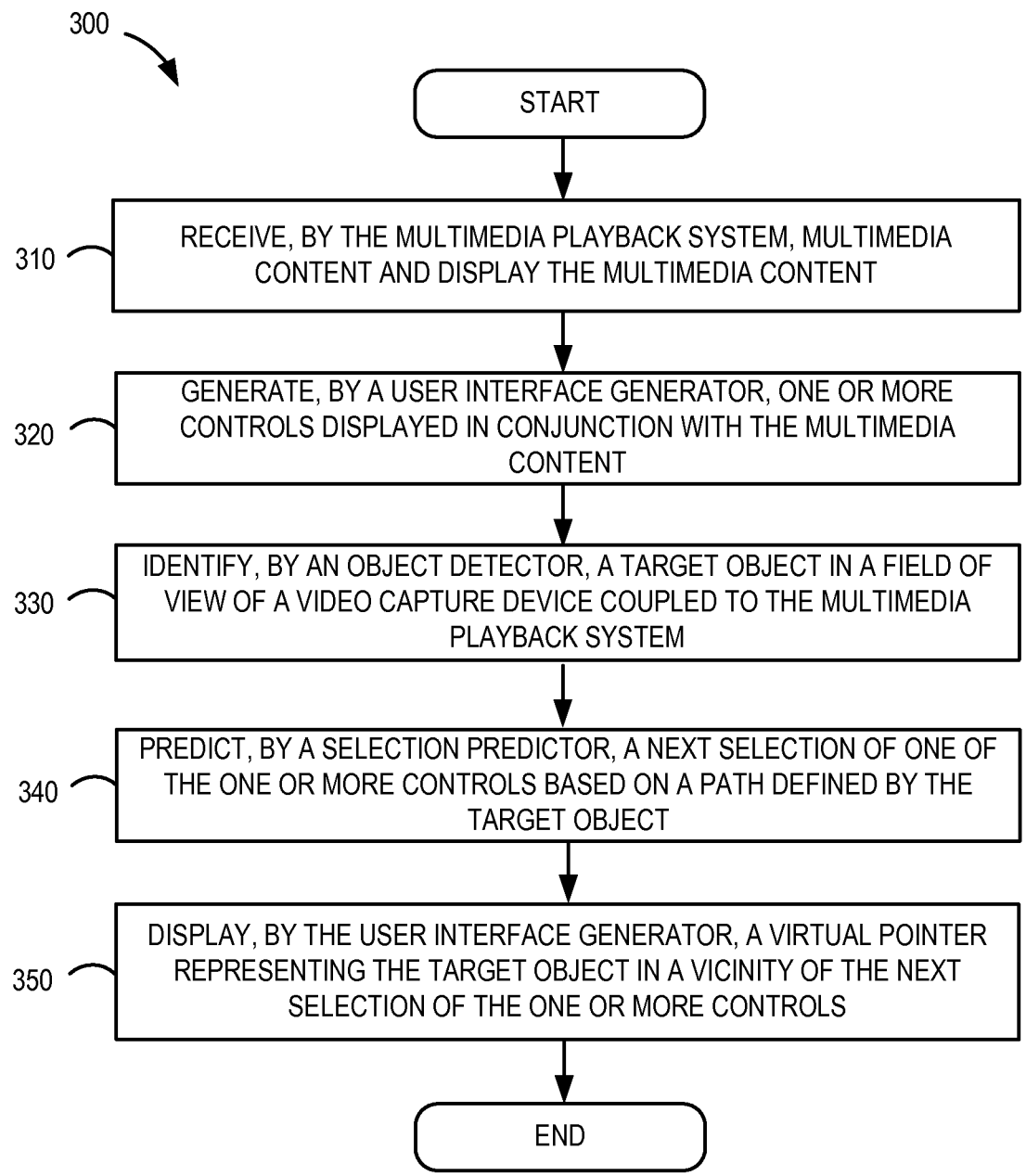
FIG. 3 is a method in accordance with an embodiment performed in the multimedia playback system of FIG. 1 for adaptively modifying a user interface.

Reference is now made to FIG. 3, which is a flowchart 300 for a method for adaptively updating a user interface performed by the multimedia playback system 102 of FIG. 1. If embodied in software, each block depicted in FIG. 3 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIG. 1. The machine code may be converted from the source code, etc. If embodied in hardware, each block may represent a circuit or a number of interconnected circuits to implement the specified logical function(s).

Although the flowchart 300 of FIG. 3 shows a specific order of execution, it is understood that the order of execution may differ from that which is depicted. In block 310, the multimedia playback system 102 of FIG. 1 receives multimedia content 115 and displays the multimedia content 115. In block 320, the user interface generator 118 generates one or more controls displayed in conjunction with the multimedia content 115. In block 330, the object detector 116 identifies a target object in a field of view of a video capture device 110 coupled to the multimedia playback system 102. In block 340, the selection predictor 114 predicts a next selection of one of the one or more buttons based on a path defined by the target object. For some embodiments, the selection predictor 114 predicts a next selection based on the speed of the target object being less than a predetermined speed and/or the target object moving within a predefined boundary. For example, the predefined boundary may comprise but is not limited to, a rectangular area in the field of view. In block 350, the user interface generator 118 displays a virtual pointer representing the target object in a vicinity of the predicted next selection of the one or more controls. For some embodiments, the predicting and displaying operations above are performed upon the target object moving in approximately a straight line from the initial object reference point and upon the target object exceeding a predetermined distance measured from the initial object reference point.

Further, the virtual pointer and the generated one or more controls are displayed together. In accordance with some embodiments, the method further comprises generating the one or more controls according to a location associated with one or more previously-identified objects if no objects are currently identified. For example, if a previously-detected user disappears from the field of view, then the system generates one or more controls that are located where the user was last detected. For some embodiments, the target object comprises a user's hand, a remote sensor device, or a passive object in the user's hand such as for example, a pointer, a wand, etc.

To further illustrate various aspects for adaptively updating a user interface performed by the multimedia playback system 102 in FIG. 1, reference is made to FIG. 6, which illustrates the concept of an object reference point. Various embodiments determine a path defined by the target object 602 being tracked. Typically, the target object 602 comprises the user's hand, and depending on the distance traversed by the target object 602, a prediction is made by the selection predictor 114 in FIG. 1. The object reference point serves as the starting point for measuring the distance traversed.

In accordance with some embodiments, the object reference point is marked based on the target object 602 (e.g., a user's hand) being stationary for a predetermined amount of time. For example, if a user raises his hand and keeps his hand stationary for a predetermined time of 3 seconds, the object detector 116 (in FIG. 1) marks the location of the user's hand as the object reference point. The object reference point may be stored according to a pixel location on the display area 402. Furthermore, the approximate center point of the target object 602 may be used as the location of the object reference point. In accordance with some embodiments, the target object 602 is identified by the object detector 116 based on a color comparison of pixels in the field of view of the video capture device 110. If a pixel block/area matches a target color (e.g., the color of an individual's hand), the target object 602 is determined to be in that area. The object reference point may then be assigned to the center of the identified pixel block or area.

Figure 7A:
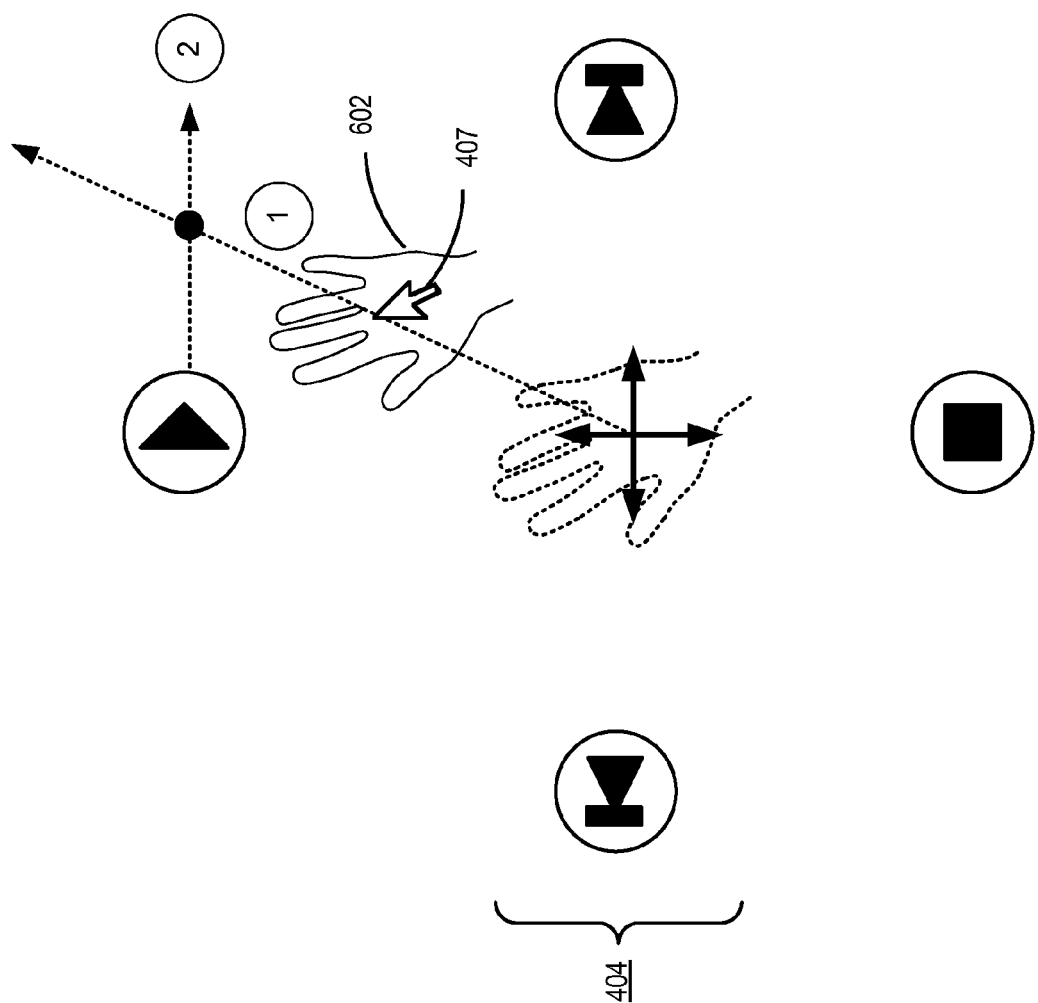

As described earlier, the controls 404 are adaptively relocated based on the path defined by the motion of the target object 602, whereby a control associated with the predicted selection is moved into the path of the target object 602 (see FIG. 7A). As described earlier, the target object 602 is typically not shown on the display. Rather, a virtual pointer 407 such as the one shown moves in conjunction with the target object 602. Thus, in the example shown, the control associated with the predicted selection is moved into the path of the virtual pointer 407.

Figure 7B:
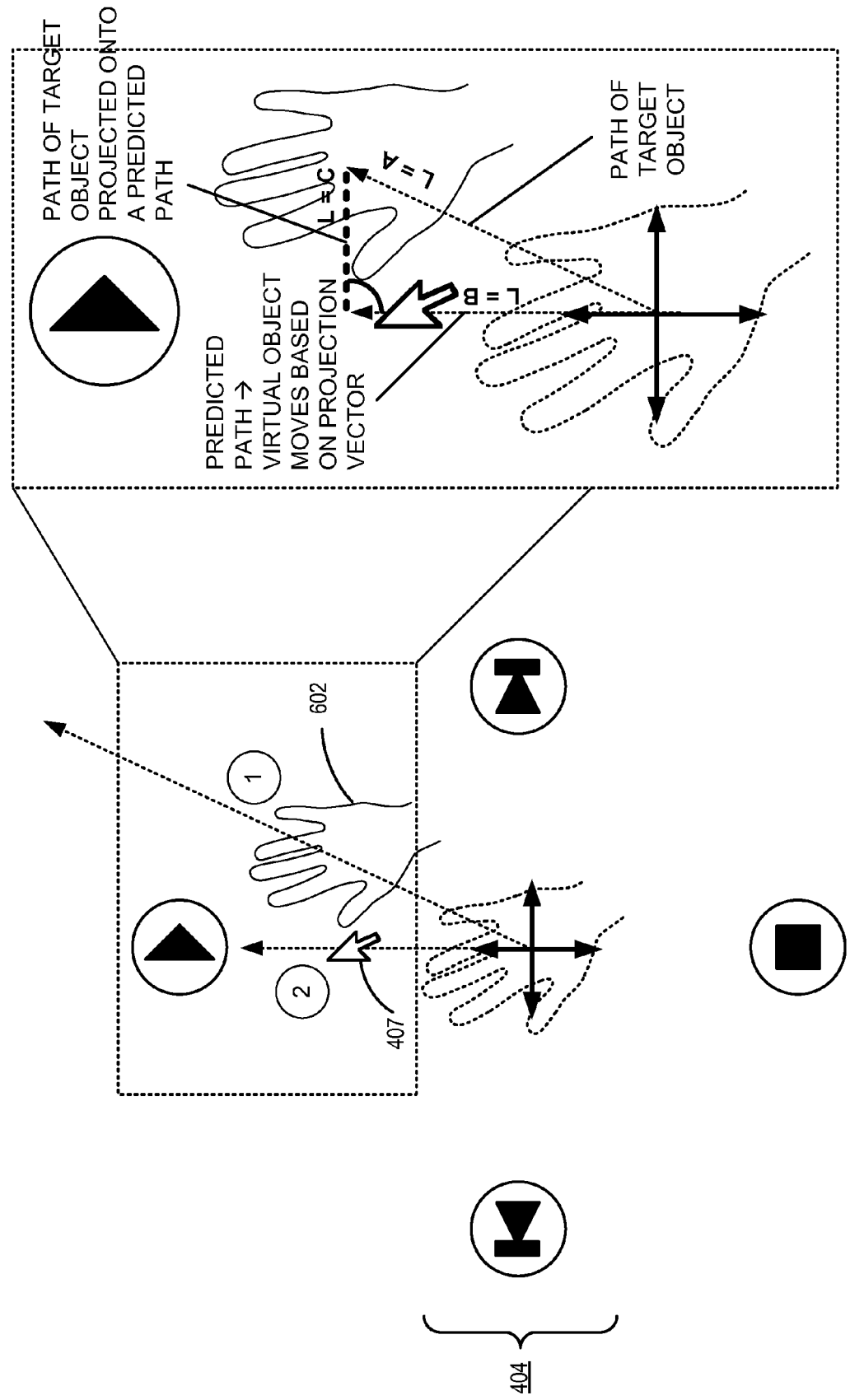

Reference is made to FIG. 7B. In accordance with other embodiments, the controls 404 remain stationary while the virtual pointer 407 associated with the target object 602 moves according to the predicted selection. For example, as shown in FIG. 7B, the selection predictor 114 of FIG. 1 predicts that the user wishes to select the play button based on the path of movement associated with the target object 602.

For some embodiments, the virtual pointer 407 is moved along a direct path to the next predicted selection (the play button). Note that the path of the virtual pointer 407 will not necessarily align with that of the target object 602 as the virtual pointer 407 is moved directly from the object reference point to the predicted selection. With the embodiment depicted in FIG. 7B, the user "feels" as if the virtual pointer 407 moves towards the controls 404 when in fact, the system (e.g., the multimedia playback system 102 of FIG. 1) is adjusting the coordinates of the controls 404 such that the controls 404 are actually moving closer to the virtual pointer 407.

Note that the actual coordinate of the target object 602 captured by the video capture device 110 comprises the actual value. Thus, for some embodiments, the system utilizes a mapping table (not shown) to store relationship information associated with the location of the controls 404 and the location of the target object 602. The mapping table is then used to transform the coordinates used by the multimedia playback system 102 for establishing the display area in order to synchronize the relative placement of the virtual pointer 407 with respect to the controls 404. Based on information stored in the mapping table, the system moves the virtual pointer 407 in the display area. For some implementations, the mapping table is stored in a mass storage device such as the one 226 described in connection with FIG. 2. Note that for alternative embodiments, a mapping table is not used. Rather, the coordinate conversion/transformation process is performed directly to maintain the adjusted relative relationship between the controls and the target object.

For some embodiments, coordinate conversion/transformation can be performed without using a mapping table. For such embodiments, a projection vector is identified based on extension of a path of the target object 602 onto a predicted path, along which the virtual pointer 407 traverses. In the example shown in FIG. 7B, the projection vector represents the final path of the virtual pointer 407 along a predicted path. Specifically, the length and direction of movement of the virtual pointer 407 is defined by the projection vector. The length of the projection vector represents a "projected length" of the path of the target object. Accordingly, the system maps out a projection vector from the initial position of the target object 602 to the predicted next selection. The virtual pointer 407 then traverses this path.

To further illustrate, suppose the path of the target object has a length A (L=A), as shown in FIG. 7B. Suppose also that the projection of the path of the target object onto the predicted path has a length C (L=C), and that the projection vector has a length B (L=B). Generally, the projection of the path of the target object onto the predicted path is such that a right angle is formed between the sides corresponding to lengths B and C. Note, however, that this is just one possible implementation, and other angles may be used as well. The virtual pointer 407 thus moves a length B along the predicted path.

Figure 9:
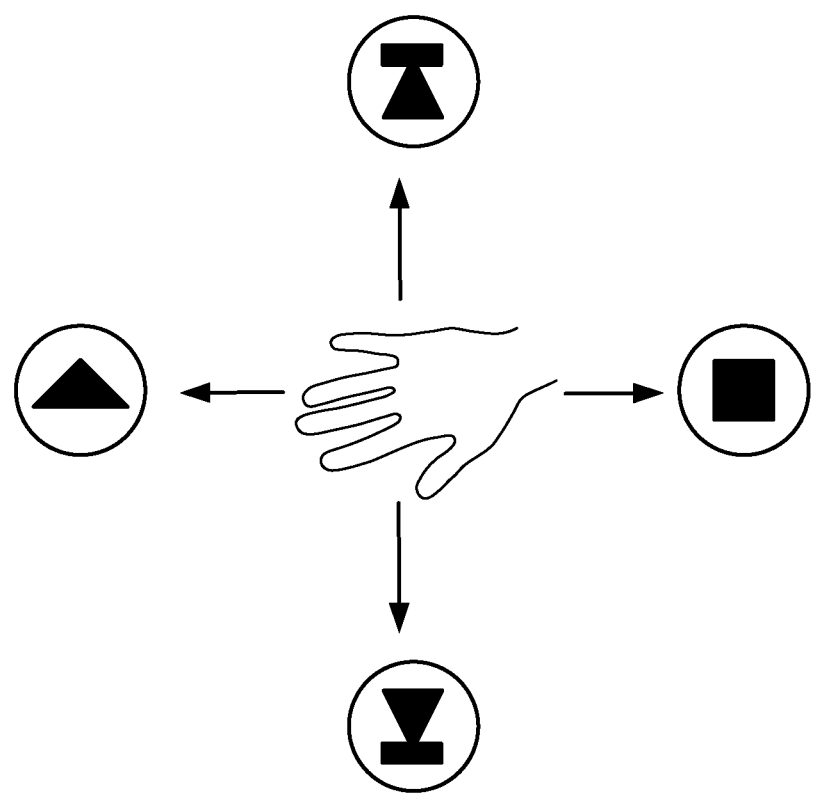

Details regarding the operation of the selection predictor 114 in FIG. 1 are now described. As illustrated in FIG. 8, the target object (e.g., a user's hand) can move in any direction. In reality, however, the selection predictor 114 only needs to determine whether the target object is moving towards one of the controls displayed. In the example shown in FIG. 9, four playback controls are shown. Thus, there are only four degrees of freedom. It should be emphasized that the four controls depicted in the figures are only shown for purposes of illustration and are not intended to limit the various embodiments described herein. The embodiments described may be configured to work with any number of controls.

Figure 10:
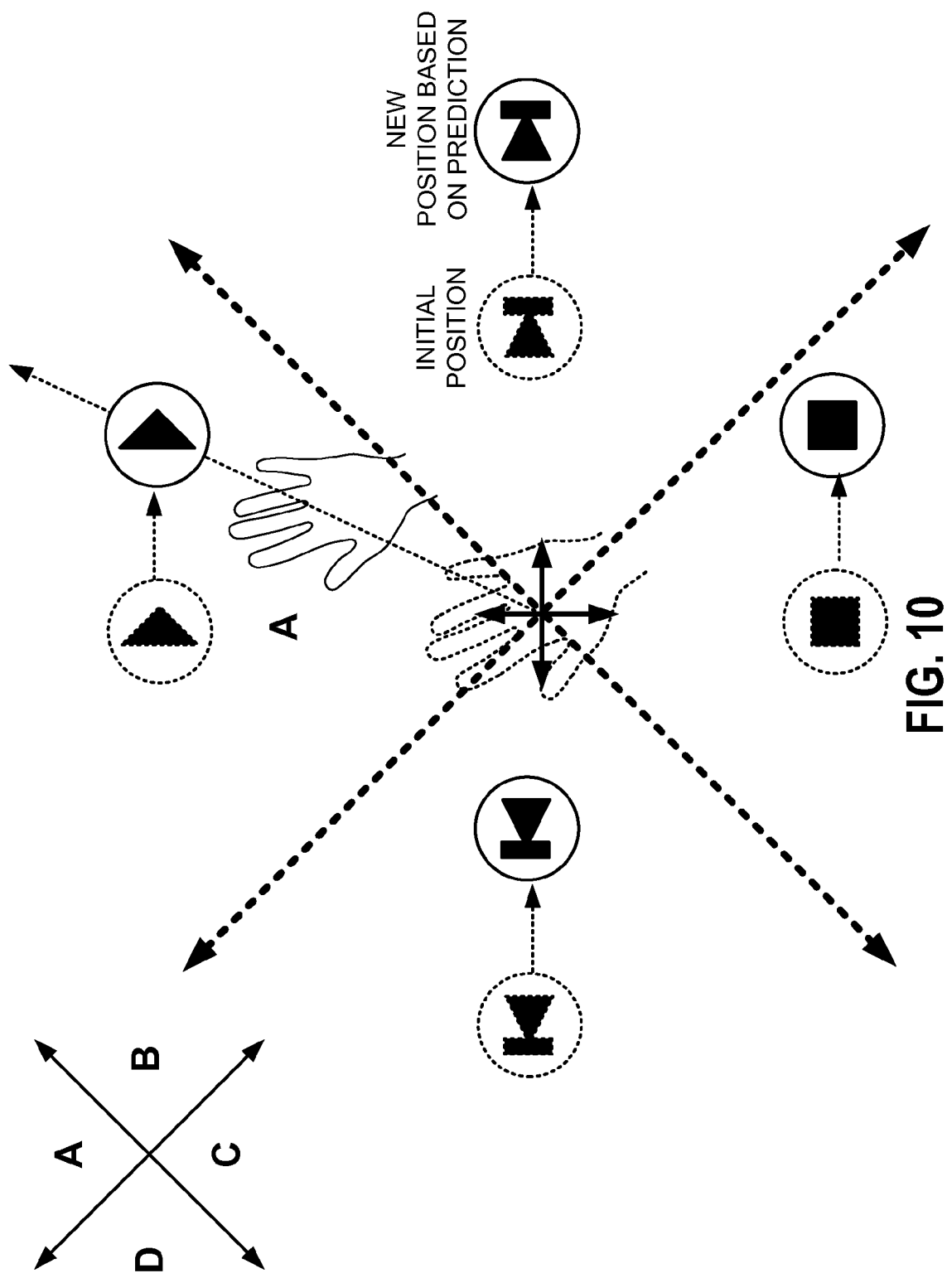

As shown in FIG. 10, the two-dimensional plane in which the target object moves can be divided into four quadrants. If the object detector 116 determines that the target object is moving to the right in an upward location, the object detector 116 first determines that the target object is moving in quadrant A. Within quadrant A, the object detector 116 determines that the target object is moving closer to the top control (i.e., the play button). Based on this path defined by the target object, the selection predictor 114 predicts that the user intends to select the play button as the next selection. Accordingly, the user interface generator 118 adjusts the user interface such that the play button moves directly into the path of the target object.

Figure 11:
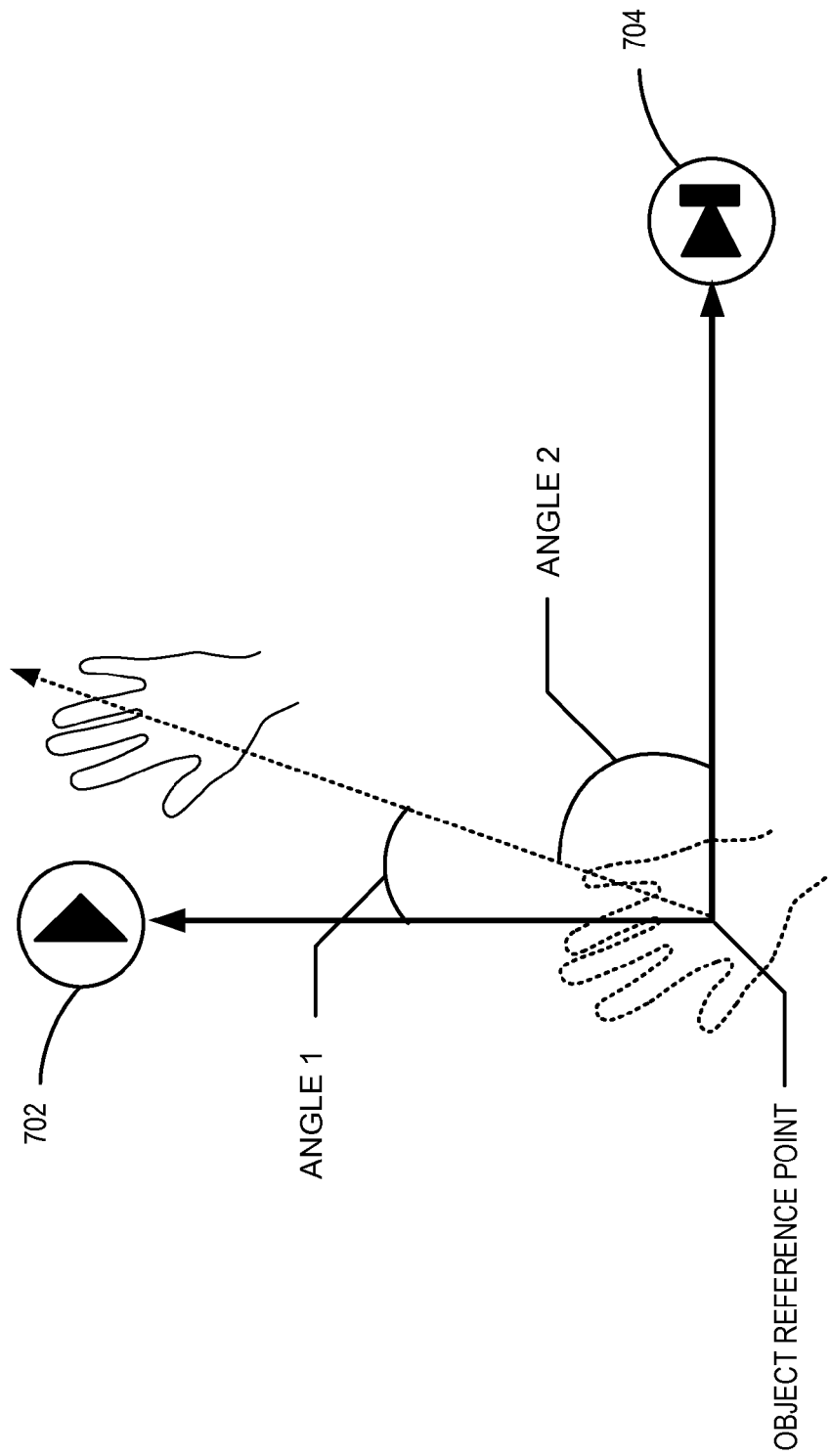
Figure 14:
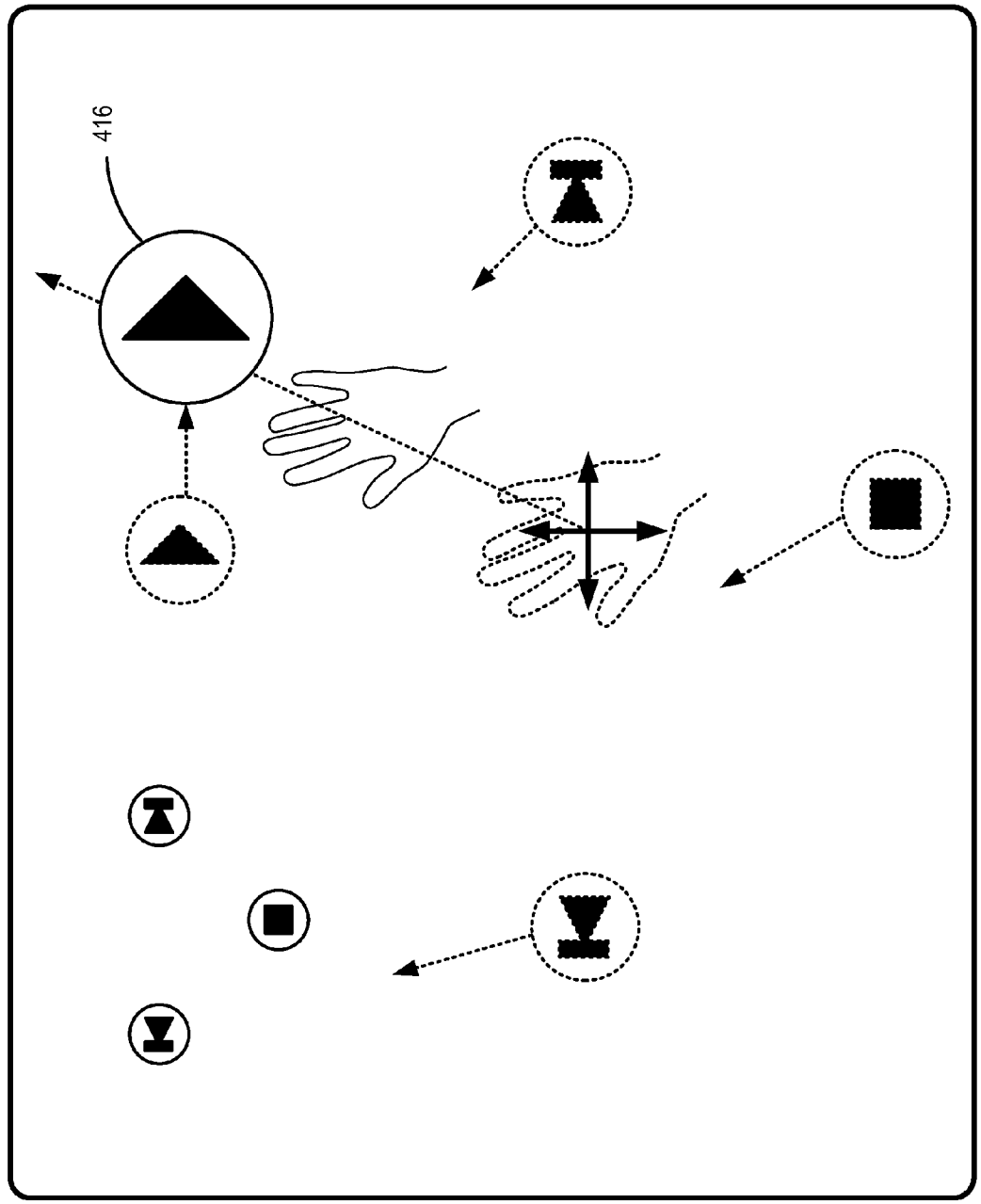

Reference is made to FIG. 11, which illustrates how the selection predictor 114 predicts the next selection by the user based on movement of the target object. As shown, the path of the target object forms a first angle ("Angle 1") with the path extending from the object reference point to the top control 702. The path of the target object forms a second angle ("Angle 2") with the path extending from the object reference point to the right control 704. Based on the smallest angle, the selection predictor 114 makes a prediction of which control the user is about to select. In the illustration of FIG. 14, the user is closer to the top control 702. Therefore, the next selection is determined to be this control 702.

Figure 12:
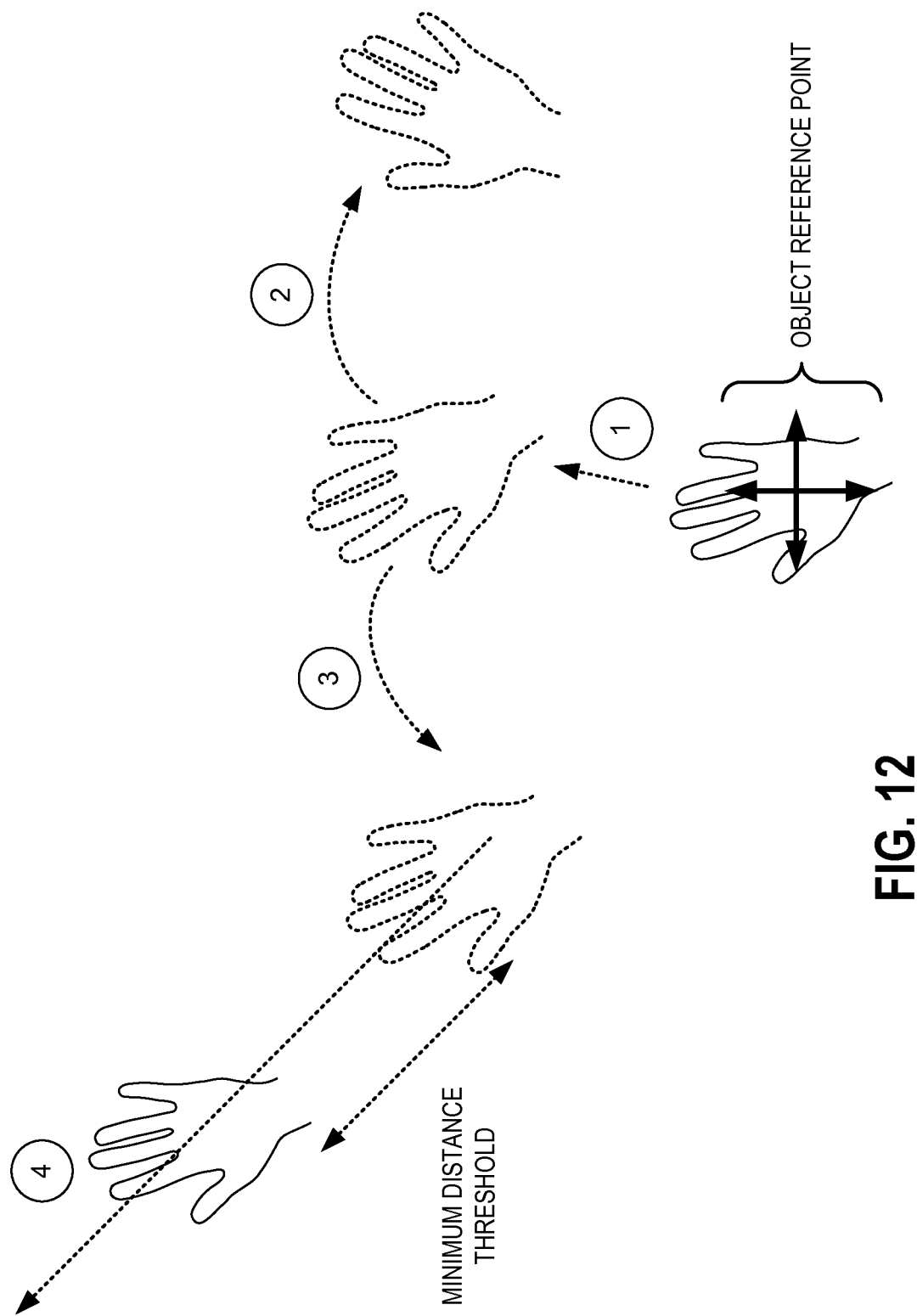

Turning now to FIG. 12, for some embodiments, the selection predictor 114 makes a prediction of the next selection when the target object traverses a straight path for a predetermined distance. As shown in FIG. 1, the user initially waves his hand before traversing in a straight line. Once the minimum distance threshold is met, the selection predictor 114 makes a prediction, and the user interface generator 118 adjusts the controls accordingly. This is to prevent the controls from constantly being updated. However, in accordance with other embodiments, the absolute distance between the object reference point and the target object is taken into account.

Figure 13A:
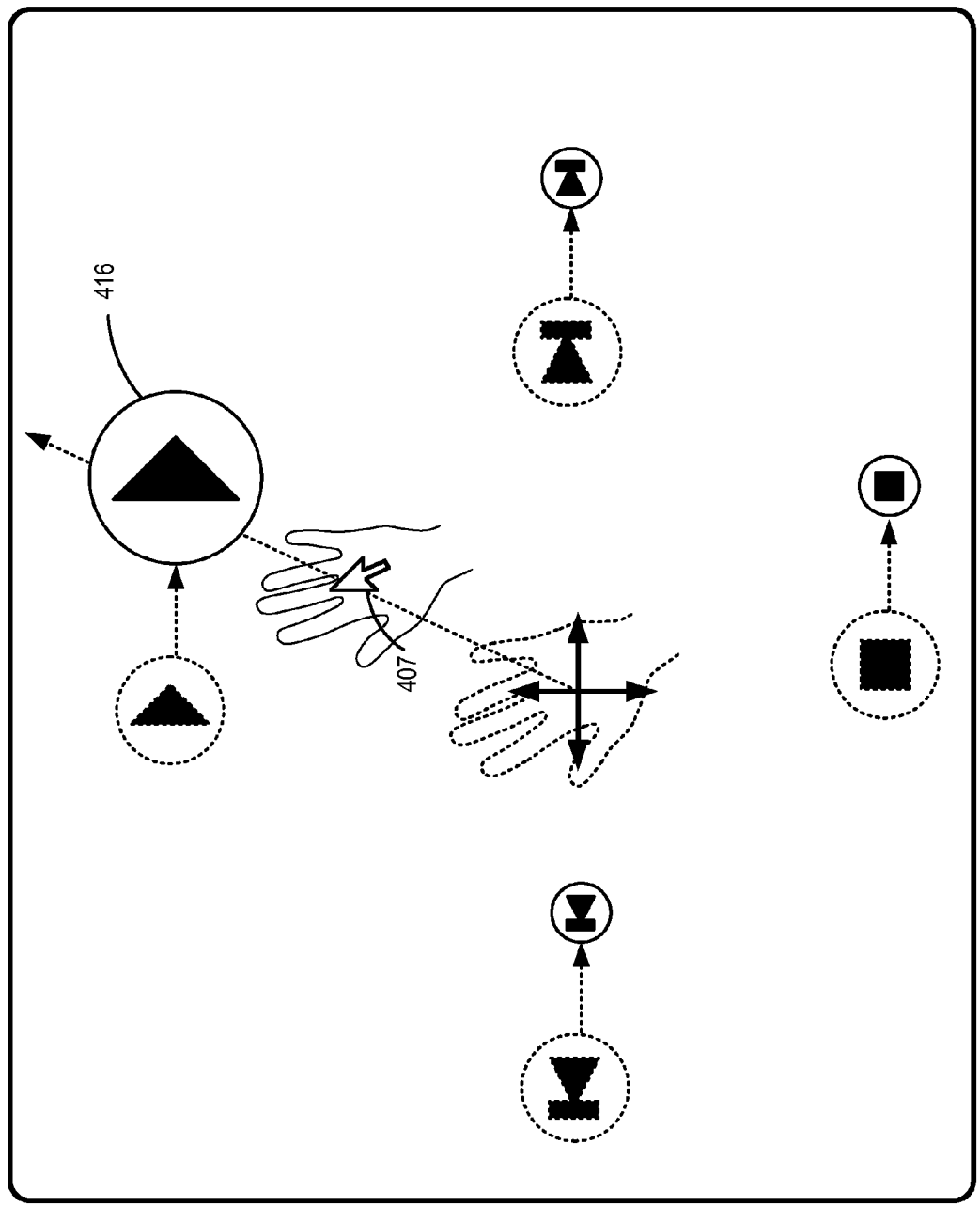

Reference is made to FIGS. 13A, B, and FIG. 14, which illustrate various ways in which the control associated with the predicted selection is highlighted in accordance with some embodiments. As illustrated in FIG. 13A, the control associated with the predicted selection may be enlarged for some implementations, thereby making it even easier for the user to select the control. In the example shown, the selection predictor 114 predicts that the next selection that the user will make is the play button 416. The user interface generator 118 thus adjusts the location of the controls such that the play button 416 is directly in the path of the target object. Furthermore, the user interface generator 118 enlarges the play button. In the implementation shown, all the buttons are moved together as a group based on the new positioning of the play button 416. As described earlier, the target object (e.g., the user's hand in the illustration of FIG. 13A) is typically not shown on the display. Rather, a virtual pointer 407 such as the one shown moves in conjunction with the target object. Thus, in the example shown in FIG. 13A, the enlarged control associated with the predicted selection is moved into the path of the virtual pointer 407.

Figure 13B:
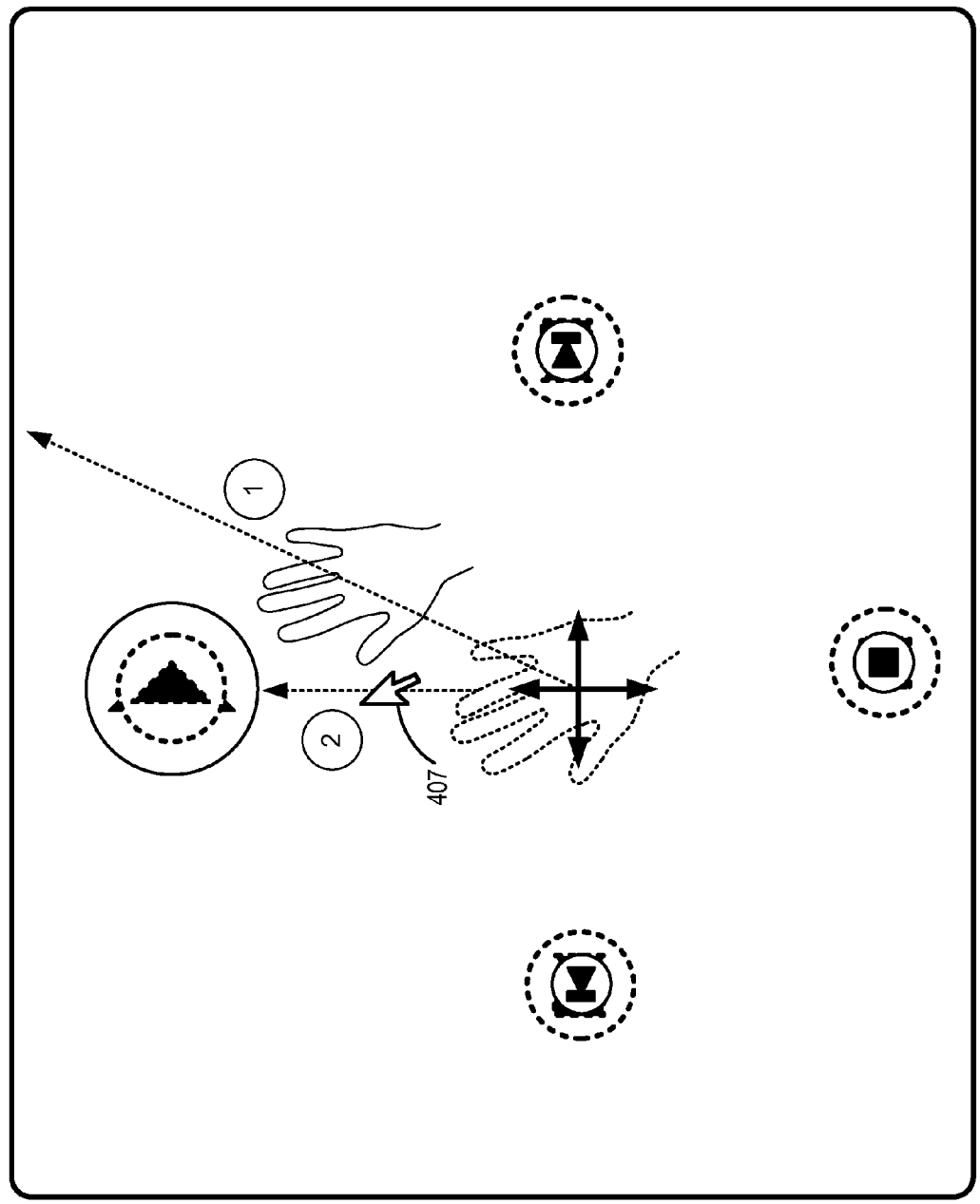

Referring now to FIG. 13B, an alternative embodiment is shown where the controls remain stationary while the virtual pointer 407 associated with the target object (the user's hand) moves according to the predicted selection. For example, as shown in FIG. 13B, the selection predictor 114 of FIG. 1 predicts that the user wishes to select the play button based on the path of movement associated with the target object. For some embodiments, the virtual pointer 407 is moved along a direct path to the next predicted selection (the play button). As with the embodiment illustrated in FIG. 13A, the next predicted control (the play button) is enlarged while the remaining controls become smaller to de-emphasize these controls. (The controls shown with the dashed lines represent the original size of the controls.)

Note that the path of the virtual pointer 407 will not necessarily align with that of the target object 602 as the virtual pointer 407 is moved directly from the object reference point to the predicted selection. With the embodiment depicted in FIG. 13B, the user "feels" as if the virtual pointer 407 moves towards the controls when in fact, the system (e.g., the multimedia playback system 102 of FIG. 1) is adjusting the coordinates of the controls such that the controls are actually moving closer to the virtual pointer 407. Note that the actual coordinate of the target object captured by the video capture device 110 comprises the actual value. As described earlier in connection with 7B, for the implementation in FIG. 13B, the system utilizes a mapping table (not shown) to store relationship information associated with the location of the controls and the location of the target object.

Referring now to FIG. 14, for some embodiments, only the control associated with the predicted selection is moved into the path of the target object, while the remaining controls are moved to another location on the display. For some implementations, the remaining controls may also be made smaller (or disappear) to de-emphasize these controls, while the play button 416 is enlarged.

Figure 15:
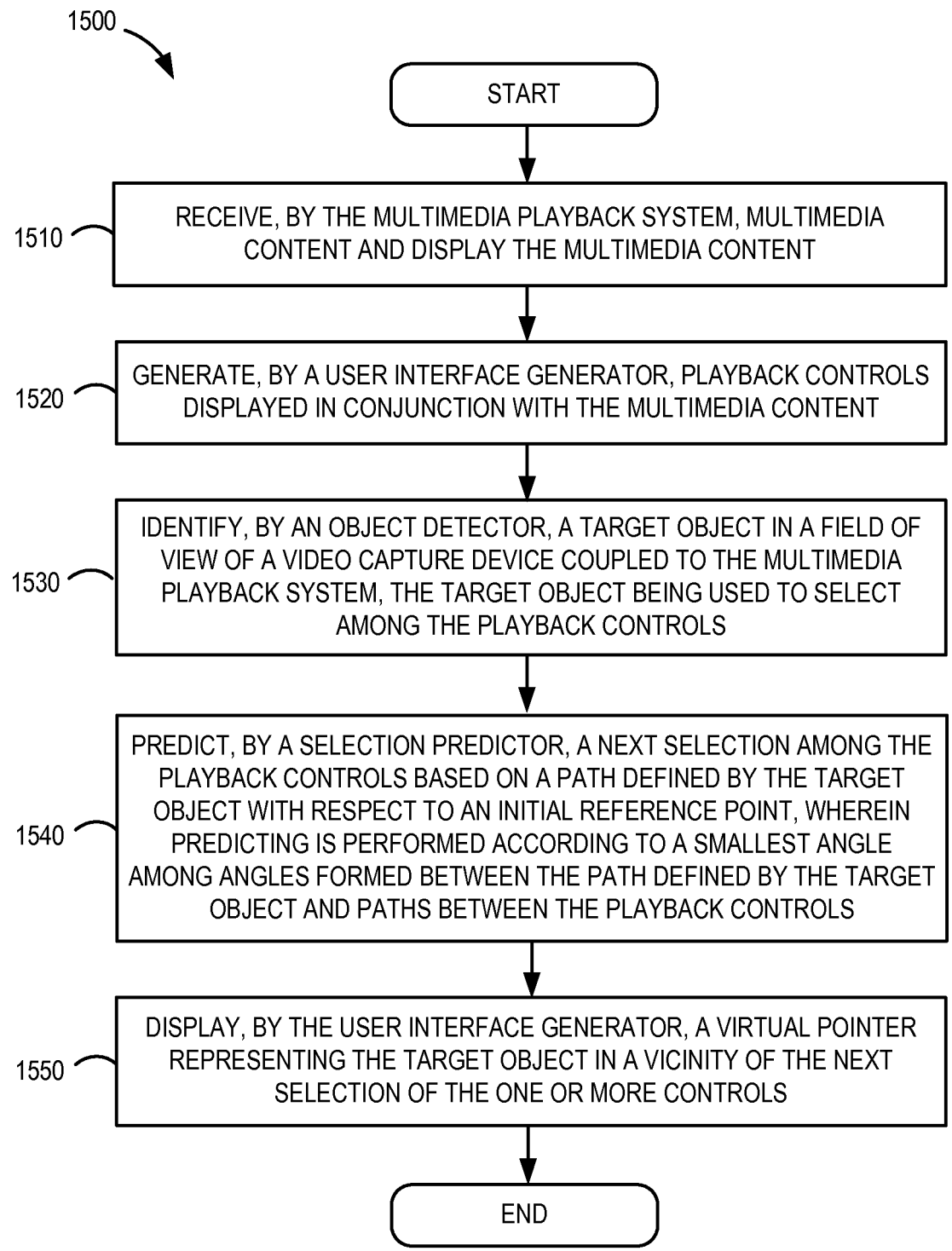
FIG. 15 is method in accordance with an alternative embodiment performed in the multimedia playback system of FIG. 1 for adaptively modifying a user interface.

FIG. 15 is another method in accordance with an embodiment performed in the multimedia playback system of FIG. 1 for adaptively modifying a user interface. If embodied in software, each block depicted in FIG. 15 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIG. 1. The machine code may be converted from the source code, etc. If embodied in hardware, each block may represent a circuit or a number of interconnected circuits to implement the specified logical function(s).

Although the flowchart 1500 of FIG. 15 shows a specific order of execution, it is understood that the order of execution may differ from that which is depicted. In block 1510, the multimedia playback system 102 in FIG. 1 receives multimedia content 115 and displays the multimedia content 115. In block 1520, the user interface generator 118 generates playback controls such as the ones 404 depicted in FIG. 4, where the playback controls are displayed in conjunction with the multimedia content 115. Note that controls are not limited to playback controls and may comprise other types of controls/tools as well. In block 1530, the object detector 116 identifies a target object in a field of view of a video capture device 110 coupled to the multimedia playback system 102, the target object being used to select among the playback controls.

In block 1540, the selection predictor 114 predicts a next selection among the playback controls based on a path defined by the target object with respect to an initial reference point, wherein predicting is performed according to a smallest angle among angles formed between the path defined by the target object and paths between the playback controls. For example, as described earlier in connection with FIG. 11, the angle formed between the path defined by the user's hand and the path defined between the play button 702 and the object reference point is smaller than the angles (e.g., Angle 2 in FIG. 11) corresponding to the other controls. Thus, the next selection is predicted to be that of the play button 702. In block 1550, the user interface generator 118 displays a virtual pointer representing the target object in a vicinity of the next selection of the one or more controls.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method performed in a multimedia playback system for adaptively modifying a user interface, comprising:
    receiving, by the multimedia playback system, multimedia content and displaying the multimedia content;
    generating, by a user interface generator, one or more selectable multimedia controls displayed in conjunction with the multimedia content, wherein each of the multimedia controls corresponds to a command for controlling the multimedia content;
    identifying, by an object detector, a target object in a field of view of a video capture device coupled to the multimedia playback system, and an initial object reference point of the target object, wherein the target object comprises one of: a user's hand, a remote sensor device, and a passive object in the user's hand;
    predicting, by a selection predictor, a next selection of one of the one or more selectable multimedia controls based on a path of movement associated with the target object with respect to the initial object reference point; and
    displaying, by the user interface generator, a virtual pointer representing the target object in a vicinity of the next selection of the one or more multimedia controls based on predicting the next selection, wherein displaying comprises
    moving the one or more multimedia controls toward the virtual pointer by adaptively relocating the one or more multimedia controls based on the path of movement associated with the target object, wherein predicting and displaying are performed upon the target object performing an approximately straight-line movement from the initial object reference point and upon exceeding a predetermined distance.

2. The method of claim 1, wherein the virtual pointer and the generated one or more multimedia controls are displayed together.

3. The method of claim 1, further comprising the user interface generator generating the one or more multimedia controls in a default location if no target object is identified.

4. The method of claim 1, further comprising generating by the user interface generator the one or more multimedia controls according to a location associated with one or more previously-identified objects if no objects are currently identified.

5. The method of claim 1, wherein generating one or more multimedia controls is performed in response to identifying the target object.

6. The method of claim 1, wherein displaying the virtual pointer is performed in response to detecting motion by the target object.

7. The method of claim 1, wherein the steps of predicting and displaying are performed upon the target object moving a predetermined distance from the initial object reference point.

8. The method of claim 1, wherein predicting a next selection of one of the one or more multimedia controls based on a path defined by the target object comprises determining a smallest angle among angles formed between the path defined by the target object and paths from the object reference point to each of the one or more multimedia controls.

9. The method of claim 1, further comprising hiding the one or more multimedia controls on the user interface if a previously-identified target object disappears from the field of view or cannot be identified for a predetermined amount of time.

10. The method of claim 1, wherein identifying a target object comprises identifying an area within the field of view of the video capture device that substantially matches a target color.

11. The method of claim 1, further comprising hiding the one or more multimedia controls from the user interface if the target object remains stationary for a predetermined amount of time.

12. The method of claim 11, wherein the hiding step is not performed if the object remains stationary located above the one or more multimedia controls.

13. The method of claim 1, wherein predicting a next selection is performed based on one or more of:
    a speed of the target object being less than a predetermined speed; and
    the target object moving within a predefined boundary.

14. The method of claim 13, wherein the predefined boundary comprises the field of view of the video capture device.

15. A multimedia playback system configured to adaptively modify a user interface, comprising:
    a computing device;
    a user interface generator executable in the computing device and configured to generate one or more selectable multimedia controls displayed in conjunction with a multimedia content displayed by the multimedia playback system, wherein each of the multimedia controls corresponds to a command for controlling the multimedia content;
    an object detector executable in the computing device and configured to identify a target object in a field of view of a video capture device coupled to the multimedia playback system, wherein the target object comprises one of: a user's hand, a remote sensor device, and a passive object in the user's hand; and
    a selection predictor executable in the computing device and configured to predict a next selection of one of the one or more selectable multimedia controls based on a path defined by the target object, wherein the user interface generator displays a virtual pointer representing the target object in a vicinity of the predicted next selection of the one or more multimedia controls based on predicting the next selection,
    wherein the user interface generator displays the one or more multimedia controls according to a location of the target object with respect to the video capture device, wherein displaying by the user interface generator comprises moving the one or more multimedia controls toward the virtual pointer by adaptively relocating the one or more multimedia controls based on the path of movement associated with the target object wherein predicting and displaying are performed upon the target object performing an approximately straight-line movement from the initial object reference point and upon exceeding a predetermined distance.

16. The system of claim 15, wherein the virtual pointer and the generated one or more multimedia controls are displayed together.

17. The system of claim 15, wherein the one or more multimedia controls comprise playback controls for controlling playback of the multimedia content.

18. The system of claim 15, wherein the target object comprises a hand of a user of the multimedia playback system, the hand being used to manipulate the one or more multimedia controls.

19. A method performed in a multimedia playback system for adaptively modifying a user interface, comprising:

receiving, by the multimedia playback system, multimedia content and displaying the multimedia content;

generating, by a user interface generator, one or more selectable playback controls displayed in conjunction with the multimedia content;

identifying, by an object detector, a target object in a field of view of a video capture device coupled to the multimedia playback system, the target object being used to select among the playback controls, wherein the target object comprises one of: a user's hand, a remote sensor device, and a passive object in the user's hand; predicting, by a selection predictor, a next selection among the selectable playback controls based on a path defined by the target object with respect to an initial reference point, wherein predicting is performed according to a smallest angle among angles formed between the path defined by the target object and paths between the playback controls; and displaying, by the user interface generator, a virtual pointer representing the target object in a vicinity of the next selection of the one or more playback controls based on predicting the next selection, wherein displaying comprises moving the one or more playback controls toward the virtual pointer by adaptively relocating the one or more playback controls based on the path of movement associated with the target object, wherein predicting and displaying are performed upon the target object performing an approximately straight-line movement from the initial object reference point and upon exceeding a predetermined distance.

20. The method of claim 19, wherein the virtual pointer and the generated one or more playback controls are displayed together.

* * * * *